(12) United States Patent
Yun et al.

(10) Patent No.: US 7,829,219 B2
(45) Date of Patent: Nov. 9, 2010

(54) CATHODE FOR LITHIUM SECONDARY BATTERIES HAVING IMPROVED COATING PROPERTIES AND LITHIUM SECONDARY BATTERIES USING THE SAME

(75) Inventors: Hui Chan Yun, Daegukwangyeok-si (KR); Jong Seob Kim, Daegukwangyeok-si (KR); Ho Seok Yang, Daejeonkwangyeok-si (KR); Young Ki Lee, Gyeongsangbuk-do (KR); Dong Hak Kwak, Gyeongsangbuk-do (KR)

(73) Assignee: Ecopro Co. Ltd., Chungcheongbuk-do (KR)

( * ) Notice: Subject to any disclaimer, the term of this patent is extended or adjusted under 35 U.S.C. 154(b) by 1235 days.

(21) Appl. No.: 11/314,210

(22) Filed: Dec. 21, 2005

(65) Prior Publication Data

US 2006/0141358 A1    Jun. 29, 2006

(30) Foreign Application Priority Data

Dec. 23, 2004    (KR) ...................... 10-2004-0111414
Nov. 9, 2005    (KR) ...................... 10-2005-0106944

(51) Int. Cl.
*H01M 4/60*    (2006.01)
*H01M 4/62*    (2006.01)

(52) U.S. Cl. ................... 429/212; 429/217; 429/232
(58) Field of Classification Search .................. None
See application file for complete search history.

(56) References Cited

U.S. PATENT DOCUMENTS 6,451,480 B1 *    9/2002    Gustafson et al. ........... 429/217
2002/0064712 A1 *    5/2002    Sekino et al. ............... 429/330

OTHER PUBLICATIONS

Wu et al., "Preparation and characterization of plasticized PEO polymer electrolytes", 2001, Institute of Chemistry Academic Sinica, 59 (2), pp. 143-153.*

* cited by examiner

*Primary Examiner*—Dah-Wei D Yuan
*Assistant Examiner*—Kwang Han
(74) *Attorney, Agent, or Firm*—Summa, Additon & Ashe, P.A.

(57) ABSTRACT

A cathode for lithium secondary batteries coated with a slurry including an active material, a binder and a solvent, and further including a polymerization inhibitor, is disclosed. Gelation of the slurry is prevented during production of the cathode so that adhesion of the slurry is enhanced, thus achieving improved coating properties of the cathode and facilitating the coating of the slurry.

25 Claims, No Drawings

CATHODE FOR LITHIUM SECONDARY BATTERIES HAVING IMPROVED COATING PROPERTIES AND LITHIUM SECONDARY BATTERIES USING THE SAME

BACKGROUND OF THE INVENTION

The present invention relates to a cathode for lithium secondary batteries, and more particularly to a cathode for lithium secondary batteries having a coating of active materials with improved properties Lithium metal oxides ($LiMO_2$) currently used as cathode active materials in lithium secondary batteries are typically in the form of spherical or pseudo-spherical powders. It can be advantageous to use a powder having superior adhesion between particles to improve electronic conductivity of the battery.

Polyvinylidene fluoride (PVdF) is a useful binder for lithium metal oxide particles. PVDF includes fluorine (F) atoms, which have the highest electronegativity of all of the elements of the periodic table, and hydrogen (H) atoms, which have the lowest electronegativity of all the elements of the periodic table. Accordingly, PVDF polymer includes a monomer with a molecular structure having a high dipole moment.

PVdF can be used as a binder for pole plates in lithium ion batteries and lithium polymer batteries, and typically has a number average molecular weight of from 130,000 to 220,000. PVDF commonly exists in α- and β-phases during its preparation. However, the α-phase is transformed into a distorted γ-phase during solvent casting of PVdF.

Generally, PVDF binder can be applied to a cathode by dissolving the binder in a suitable solvent, such as N-methylpyrrolidone (NMP), to form a solution, adding an active material to the solution, and mixing. Thereafter, a conductive agent can be added to the mixture and uniformly distributed to prepare a slurry. The slurry is coated to a uniform thickness on a collector, and dried to produce a cathode with coating solids formed on the collector.

As the liquid binder dries, the slurry changes to a solid state. That is, the binder exists in a solid state between the particles or between the collector and the particles to provide adhesion to the cathode. At this time, the PVdF is transformed into a β- or γ-phase. Since the PVDF has a structure wherein the constituent fluorine atoms are arranged in one direction, the dipole moment is greatly increased to induce the formation of a number of hydrogen bonds.

Due to this high polarity, hydrogen ions are highly susceptible to cations present in the solvent. When alkali ions, such as $Li^+$ ions, of the cathode active material approach the hydrogen ions, the polar hydrogen ions bond to the fluorine to form hydrofluoric acid (HF), which is then deintercalated. Carbon atoms losing the ions share electrons to form carbon-carbon double bonds.

The double bonds thus formed are crosslinked by the presence of oxygen, water and other crosslinking-promoting compounds, resulting in gelation of the slurry. It can be difficult, however, to coat the gelled slurry uniformly on the collector, and in addition, the particles can adhere poorly to one another or poorly to the collector plate.

Poor adhesion between the particles can result in peeling of the particles from the surface of the cathode, leading to deterioration in the safety of the final batteries. That is, the peeled cathode particles may generate microshorts inside the batteries, thus deteriorating the performance of the batteries. Further, a number of microshorts may increase the risk of a fire due to shorting.

In addition, poor adhesion between the particles and the collector causes resistance to the transfer of electrons from the particles to the collector, thus reducing the electronic conductivity. As a result, high-rate characteristics and cycle characteristics may deteriorate.

After the slurry is coated onto the collector, the particles, typically applied to a thickness of hundreds of micrometers (μm) to the collector, undergo a pressing process. The particles can continuously stick to a rotating roll during pressing, which can result in poor surface quality of the cathode. In addition, too much pressure may be applied, which can form defects in the pole plate. Accordingly, poor adhesion between the particles and the collector can lead to low yield in the fabrication of batteries.

SUMMARY OF THE INVENTION

In one aspect, the present invention is a cathode for a lithium secondary battery. The cathode of the invention has a coating thereon formed of particles of a suitable active material. The coating can exhibit improved particle adhesion to one another and to a collector plate, which can improve safety features and battery performance. Further, the cathode of the lithium battery of the invention can be produced with fewer defects and improved yields. Accordingly, the cathode of the present invention can provide these and other benefits and can eliminate or minimize the problems associated with prior cathodes.

In this aspect of the present invention, a cathode for lithium secondary batteries is coated with a slurry comprising an active material, a binder and a solvent. The slurry further includes a polymerization inhibitor, which can delay or prevent gelling of the slurry.

The polymerization inhibitor may be catechol or a derivative thereof, such as represented by Formula 1 below:

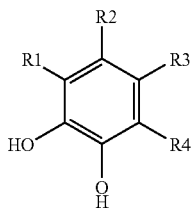

Formula 1 wherein R1, R2, R3 and R4 are each independently hydrogen or a C1-C10 alkyl group.

The catechol derivative of Formula 1 is preferably 4-tert-butyl-catechol of Formula 2 below:

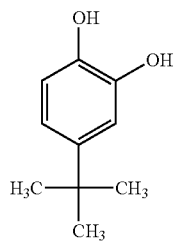

Formula 2

In one exemplary embodiment, the slurry useful for coating a cathode for lithium secondary batteries can include 0.01 to 10 parts by weight of a polymerization inhibitor, 80 to 99 parts by weight of an active material, and 0.3 to 10 parts by weight of a polyvinylidene fluoride (PVDF) binder.

The slurry useful for coating a cathode for lithium secondary batteries according to the present invention may further include 0.1 to 10 parts by weight of a conductive agent, such as acetylene black or graphite.

The active material may be a lithium transition metal composite oxide.

Another aspect of the present invention is a lithium secondary battery having a cathode coated with the slurry described herein

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The polymerization inhibitor used in the present invention is a component for delaying and/or preventing the gelation of the slurry.

The polymerization inhibitor can be catechol or a derivative thereof, such as represented by Formula 1 below:

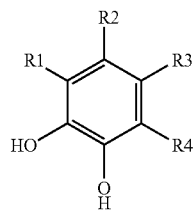

(1)

wherein R1, R2, R3 and R4 are each independently hydrogen or a C1-C10 alkyl group.

An exemplary catechol derivative of Formula 1 is 4-tert-butyl-catechol of Formula 2 below:

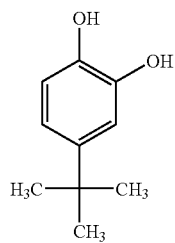

(2)

The addition of the catechol or a derivative thereof as the polymerization inhibitor can prevent or delay gelation during mixing of the slurry or during coating of the slurry on a substrate, such as a pole plate. Preventing or delaying gelling can allow uniform coating of the slurry and further can enhance adhesion of the particles to one another and to the substrate coated with the slurry.

Phenol and cresol compounds are examples of other polymerization inhibitors. In contrast to the polymerization inhibitors of the present invention, however, phenol and cresol compounds have a smaller number of hydroxyl groups, acting to inhibit the polymerization, per unit molecule than catechol compounds of the present invention. Accordingly phenols and cresols must be used in larger amounts than the catechol compounds in order to attain the same effects. In this case, however, initial discharge efficiency drops during charge/discharge after fabrication of the battery, and the high rate characteristics of the battery deteriorate.

The polymerization inhibitor can be added during preparation of the slurry. Alternatively, the polymerization inhibitor can be dissolved in a solvent before addition to the slurry. In an exemplary embodiment of the invention, a) 80 to 99 parts by weight, for example, 92 to 96 parts by weight of an active material, b) 0.3 to 10 parts by weight, for example, 1 to 6 parts by weight of a PVdF binder, and c) 0.01 to 10 parts by weight, for example, 0.05 to 2 parts by weight of a catechol or a derivative thereof are dissolved and dispersed in a solvent to prepare a cathode slurry. Thereafter, the slurry is coated on a collector, and dried to produce a cathode.

The cathode slurry may further include 0.1 to 10 parts by weight, for example, 1 to 5 parts by weight, of a conductive agent d), such as acetylene or graphite.

The solvent can be selected from the group consisting of N-methylpyrrolidone, acetone, dimethylacetamide, dimethylformaldehyde, water, and mixtures thereof.

The solvent is used in an amount sufficient to dissolve and disperse the active material, the conductive agent, the cathode binder and the polymerization inhibitor (also referred to herein as the gelation-preventing agent and/or the adhesion enhancer). The amount of solvent used can vary, depending upon factors such as the coating thickness of the cathode slurry and the production yield of the cathode, and one or ordinary skill in the art can determine an appropriate amount of solvent for a particular application without undue experimentation. The solvent is removed by drying after coating of the cathode slurry.

The adhesion enhancer used herein can be used in both cathodes and anodes for general lithium ion batteries and lithium polymer batteries.

Exemplary cathode active materials include lithium transition metal composite oxides. Exemplary lithium transition metal composite oxides useful in the invention include compounds having the formula $Li_aMO_2$ where M is at least one metal selected from the group consisting of Co, Ni, Mn, Al, Mg, Sr, Ca, P, Pb, Y and Zr, and $0.9 \leq a \leq 1.1$.

Acetylene black or graphite can be used as the conductive agent to improve electrical conductivity.

As in general secondary batteries, a solution of a lithium salt, e.g., $LiClO_4$ or $LiPF_6$, in an aprotic organic solvent can be used as an electrolyte in a battery comprising the cathode of the present invention.

The present invention will now be described in more detail with reference to the following examples. However, these examples are given for the purpose of illustration and are not to be construed as limiting the scope of the invention.

Example 1

Preparation of Slurry 96 wt % of an active material powder is mixed with 2 wt % of a conductive agent and 2 wt % of PVDF, and then the mixture is added to an aqueous NMP solution of 4-tert-butyl-catechol (5 wt %) so that the amount of the 4-tert-butyl-catechol is 0.01 wt % relative to the active material. To the resulting mixture is added an appropriate amount of NMP to prepare a slurry. While the slurry is allowed to stand at a temperature of 22° C. and a relative humidity of 50%, gelation is observed.

Production of Cathode

The slurry thus prepared is coated on an aluminum foil with a thickness of 20 μm using a doctor blade, and dried to produce a pole plate.

Fabrication of Battery

A 2016 type coin battery is fabricated in a glove box under an argon (Ar) atmosphere by using lithium as an anode and 1.15 M $LiPF_6$ in EC/DMC/DEC as an electrolyte. After the battery is aged for 12 hours to stabilize the initial voltage (OCV), a charge-discharge test is conducted at a current density (cathode) of 0.150 $mA/cm^2$ and a voltage range of 4.3~3.0 V. The discharge capacity at the first cycle (initial capacity) is shown in Table 1.

Example 2

A slurry is prepared in the same manner as in Example 1, except that the amount of 4-tert-butyl-catechol is changed to 0.03 wt % relative to the active material. A battery is fabricated using the slurry by the same procedure described in Example 1.

Example 3

A slurry is prepared in the same manner as in Example 1, except that the amount of 4-tert-butyl-catechol is changed to 0.05 wt % relative to the active material. A battery is fabricated using the slurry by the same procedure described in Example 1.

Example 4

A slurry is prepared in the same manner as in Example 1, except that the amount of 4-tert-butyl-catechol is changed to 0.07 wt % relative to the active material. A battery is fabricated using the slurry by the same procedure described in Example 1.

Example 5

A slurry is prepared in the same manner as in Example 1, except that the amount of 4-tert-butyl-catechol is changed to 0.1 wt % relative to the active material. A battery is fabricated using the slurry by the same procedure described in Example 1.

Example 6

A slurry is prepared in the same manner as in Example 1, except that the amount of 4-tert-butyl-catechol is changed to 0.2 wt % relative to the active material. A battery is fabricated using the slurry by the same procedure described in Example 1.

Example 7

A slurry is prepared in the same manner as in Example 1, except that the amount of 4-tert-butyl-catechol is changed to 0.3 wt % relative to the active material. A battery is fabricated using the slurry by the same procedure described in Example 1.

Comparative Example 1

A slurry is prepared in the same manner as in Example 1, except that 4-tert-butyl-catechol as the polymerization inhibitor is not added. A battery is fabricated using the slurry by the same procedure described in Example 1.

Comparative Example 2

A slurry is prepared in the same manner as in Example 1, except that 0.5 wt % of phenol is added instead of 4-tert-butyl-catechol as the gelation-preventing agent. A battery is fabricated using the slurry by the same procedure described in Example 1.

TABLE 1

| Example No. | 0.1 C discharge (mAh/g) | 0.1 C efficiency (%) | 1.0 C discharge (mAh/g) | 1.0 C/ 0.1 C (%) | Gelation time (hr) |
|---|---|---|---|---|---|
| Example 1 | 191.0 | 93.7 | 171.3 | 89.7 | 1 |
| Example 2 | 191.7 | 94.2 | 172.1 | 89.8 | 4 |
| Example 3 | 190.4 | 93.9 | 170.8 | 89.7 | 9 |
| Example 4 | 188.7 | 93.2 | 167.8 | 88.9 | 12 |
| Example 5 | 187.5 | 91.3 | 168.2 | 89.7 | 20 |
| Example 6 | 190.5 | 89.0 | 167.6 | 87.9 | 63 |
| Example 7 | 190.4 | 87.7 | 164.7 | 86.6 | 112 |
| Comparative Example 1 | 190.2 | 92.5 | 167.5 | 88.1 | 0.3 |
| Comparative Example 2 | 180.5 | 84.2 | 155.7 | 86.3 | 43 |

As can be seen from the data shown in Table 1, the batteries manufactured in Examples 1 to 7 show high initial discharge efficiency upon charge/discharge after fabrication and superior high-rate characteristics. In addition, gelation is substantially delayed and/or prevented during preparation of the slurries of the cathode active material.

As apparent from the above description, since the cathode for lithium secondary batteries according to the present invention has superior coating properties, it can be used in the fabrication of lithium secondary batteries having improved characteristics.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

The invention claimed is:

1. A cathode for a lithium secondary battery coated with a slurry, the slurry comprising:
   an active material;
   a binder;
   a solvent; and
   a polymerization inhibitor comprising catechol or a derivative thereof represented by Formula 1 below:

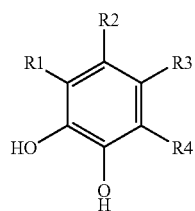

(1)

wherein R1, R2, R3 and R4 are each independently hydrogen or a C1-C10 alkyl group.

2. The cathode according to claim 1, wherein the catechol derivative of Formula 1 is 4-tert-butyl-catechol of Formula 2 below:

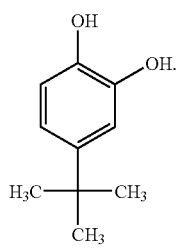

(2)

3. The cathode according to claim 1, wherein the slurry comprises:
80 to 99 parts by weight of the active material;
0.01 to 10 parts by weight of the polymerization inhibitor; and
0.3 to 10 parts by weight of the binder.

4. The cathode according to claim 3, wherein the binder comprises polyvinylidene fluoride (PVdF).

5. The cathode according to claim 3, wherein the slurry further comprises 0.1 to 10 parts by weight of a conductive agent.

6. The cathode according to claim 5, wherein the conductive agent comprises acetylene black.

7. The cathode according to claim 5, wherein the conductive agent comprises graphite.

8. The cathode according to claim 1, wherein the active material comprises a lithium transition metal composite oxide.

9. A lithium secondary battery comprising a cathode according to claim 1.

10. A slurry for coating a cathode for a lithium secondary battery, the slurry comprising:
a lithium transition metal composite oxide active material;
a binder;
a solvent; and
a polymerization inhibitor comprising catechol or a derivative thereof represented by Formula 1 below:

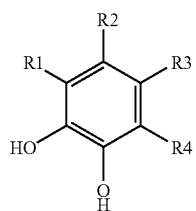

(1)

wherein R1, R2, R3 and R4 are each independently hydrogen or a C1-C10 alkyl group.

11. The slurry according to claim 10, wherein the catechol derivative of Formula 1 is 4-tert-butyl-catechol of Formula 2 below:

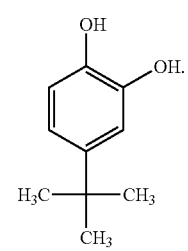

(2)

12. The slurry according to claim 10, wherein the slurry comprises:
80 to 99 parts by weight of the active material;
0.01 to 10 parts by weight of the polymerization inhibitor; and
0.3 to 10 parts by weight of the binder.

13. The slurry according to claim 12, wherein the binder comprises polyvinylidene fluoride (PVdF).

14. The slurry according to claim 12, wherein the slurry further comprises 0.1 to 10 parts by weight of a conductive agent.

15. The slurry according to claim 14, wherein the conductive agent comprises acetylene black.

16. The slurry according to claim 14, wherein the conductive agent comprises graphite.

17. A cathode for a lithium secondary battery having a coating comprising:
an active material;
a binder; and
a polymerization inhibitor comprising catechol or a derivative thereof represented by Formula 1 below:

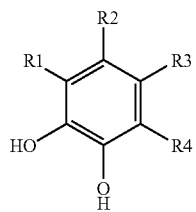

(1)

wherein R1, R2, R3 and R4 are each independently hydrogen or a C1-C10 alkyl group.

18. The cathode according to claim 17, wherein the catechol derivative of Formula 1 is 4-tert-butyl-catechol of Formula 2 below:

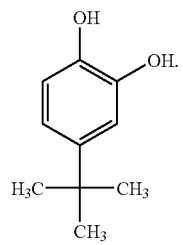

(2)

19. The cathode according to claim 17, wherein the coating comprises:

80 to 99 parts by weight of the active material;

0.01 to 10 parts by weight of the polymerization inhibitor; and 0.3 to 10 parts by weight of the binder.

20. The cathode according to claim 19, wherein the binder comprises polyvinylidene fluoride (PVdF).

21. The cathode according to claim 19, wherein the coating further comprises 0.1 to 10 parts by weight of a conductive agent.

22. The cathode according to claim 21, wherein the conductive agent comprises acetylene black.

23. The cathode according to claim 21, wherein the conductive agent comprises graphite.

24. The cathode according to claim 17, wherein the active material comprises a lithium transition metal composite oxide.

25. A lithium secondary battery comprising a cathode according to claim 17.

* * * * *